US008556722B2

(12) United States Patent
Novi et al.

(10) Patent No.: US 8,556,722 B2
(45) Date of Patent: Oct. 15, 2013

(54) STREAMING MEDIA CASTS, SUCH AS IN A VIDEO GAME OR MOBILE DEVICE ENVIRONMENT

(75) Inventors: Michael K. Novi, Brooklyn, NY (US); Derrick Horner, New York, NY (US); David J. Sturman, Port Washington, NY (US)

(73) Assignee: Microsoft Corporation, Redmond, WA (US)

(*) Notice: Subject to any disclaimer, the term of this patent is extended or adjusted under 35 U.S.C. 154(b) by 1457 days.

(21) Appl. No.: 11/616,250

(22) Filed: Dec. 26, 2006

(65) Prior Publication Data

US 2007/0265073 A1 Nov. 15, 2007

Related U.S. Application Data

(60) Provisional application No. 60/754,356, filed on Dec. 27, 2005, provisional application No. 60/774,448, filed on Feb. 17, 2006.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .............................................. 463/42; 463/35

(58) Field of Classification Search
USPC ...................................................... 463/35, 42
See application file for complete search history.

(56) References Cited

U.S. PATENT DOCUMENTS

| 6,012,984 A | 1/2000 | Roseman |
| 6,036,601 A | 3/2000 | Heckel |
| 6,183,366 B1 | 2/2001 | Goldberg et al. |
| 6,196,920 B1 | 3/2001 | Spaur et al. |
| 6,616,533 B1 | 9/2003 | Rashkovskiy |
| 6,931,451 B1 * | 8/2005 | Logan et al. .................. 709/231 |

(Continued)

FOREIGN PATENT DOCUMENTS

| EP | 0752678 A2 | 1/1997 |
| JP | 2001291004 A | 10/2001 |

(Continued)

OTHER PUBLICATIONS

U.S. Appl. No. 10/592,296, Hays et al.

(Continued)

*Primary Examiner* — Michael Cuff
*Assistant Examiner* — Kevin Y Kim
(74) *Attorney, Agent, or Firm* — Perkins Coie LLP

(57) ABSTRACT

Streamable content, including content such as music, video, and advertisements, is provided to a game program executing at a remote computing device or game console, wherein the streamable content is for presentation before, during, and/or after game play. The streamable content may be supplemental to core game content provided by the game program. A system for providing the streamable content may include a content accessing component configured to access content for use as streamable content, a content selection component configured to select appropriate content (which may be randomly selected, or selected based on user-specific information or game-specific information), a content assembly component configured to assemble selected content into one or more content streams, and/or a content dissemination component configured to disseminate one or more content streams to the remote computing device or game console on which game program is executing.

20 Claims, 10 Drawing Sheets

(56) References Cited

U.S. PATENT DOCUMENTS

| | | |
|---|---|---|
| 7,695,369 B2 * | 4/2010 | Winkler .................. 463/42 |
| 2001/0034643 A1 | 10/2001 | Acres |
| 2001/0052123 A1 | 12/2001 | Kawai |
| 2002/0013167 A1 | 1/2002 | Spaur et al. |
| 2002/0013785 A1 | 1/2002 | Miyazaki et al. |
| 2002/0065746 A1 | 5/2002 | Lewis |
| 2002/0082941 A1 | 6/2002 | Bird |
| 2002/0155891 A1 | 10/2002 | Okada et al. |
| 2002/0194601 A1 * | 12/2002 | Perkes et al. ............ 725/44 |
| 2003/0227473 A1 * | 12/2003 | Shih et al. ............. 345/716 |
| 2004/0015608 A1 | 1/2004 | Ellis et al. |
| 2004/0044567 A1 | 3/2004 | Willis |
| 2004/0204238 A1 | 10/2004 | Aoki |
| 2005/0132398 A1 * | 6/2005 | Baran et al. ............ 725/28 |
| 2005/0240487 A1 * | 10/2005 | Nemetz et al. ............ 705/26 |
| 2005/0257242 A1 * | 11/2005 | Montgomery et al. ....... 725/116 |
| 2005/0261062 A1 | 11/2005 | Lewin et al. |

FOREIGN PATENT DOCUMENTS

| | | |
|---|---|---|
| JP | 2001321556 A | 11/2001 |
| JP | 2002049849 A | 2/2002 |
| JP | 2002259823 A | 9/2002 |
| WO | WO-93/22017 A1 | 11/1993 |
| WO | WO-01/91869 A2 | 12/2001 |
| WO | WO-2004068278 A2 | 8/2004 |

OTHER PUBLICATIONS

International Search Report, PCT Application US06/62606 filed Dec. 26, 2006, date of mailing Dec. 17, 2007 (2 pages).

International Search Report, PCT Application US05/08274, filed Mar. 8, 2005, date of mailing May 30, 2006 (5 pages).

International Search Report, PCT Application US05/07782, filed Mar. 8, 2005, date of mailing Jun. 28, 2005 (2 pages).

* cited by examiner

PLEASE SELECT A CUSTOM SOUNDTRACK FOR GAME PLAY

- SOUNDTRACK 1 "Rock 'n Roller" View songs/artists in soundtrack.
- SOUNDTRACK 2 "Country Jamboree" View songs/artists in soundtrack.
- SOUNDTRACK 3 "Hip Hop Hoopty" View songs/artists in soundtrack.
- SOUNDTRACK 4 "Groovin and Movin" View songs/artists in soundtrack.
- SOUNDTRACK 5 "Fast 'n Funky" View songs/artists in soundtrack.
- SOUNDTRACK 6 "Mix to the Max" View songs/artists in soundtrack.
- SELECT CUSTOM SOUNDTRACK Pick your own songs from our song list!
- IMPORT CUSTOM SOUNDTRACK Use your own songs during game play!

*FIG. 7*

GAME OVER

MUSIC FROM THE "FAST 'N FUNKY" CUSTOM SOUNDTRACK YOU SELECTED DURING THIS GAME IS AVAILABLE FOR PURCHASE.

[ CLICK HERE TO PURCHASE MUSIC ]

*FIG. 8*

STREAMING MEDIA CASTS, SUCH AS IN A VIDEO GAME OR MOBILE DEVICE ENVIRONMENT

CROSS-REFERENCE TO RELATED APPLICATIONS

This application claims the benefit of U.S. Provisional Application No. 60/754,356, filed Dec. 27, 2005, and U.S. Provisional Patent Application No. 60/774,448, filed Feb. 17, 2006, both of which are herein incorporated in their entirety by reference.

BACKGROUND

Video games can include many different types of content. For example, the core content of a video game includes various game characters, game scenery, and game sounds. However, content providers, such as advertisers, are recognizing that video game players are an excellent audience for their content. Accordingly, many video game developers/publishers are providing content providers such as advertisers with opportunities for placing content within their games (usually for a fee). For example, game developers/publishers allow advertisement-related images to be placed within the scenery of their games (e.g., billboards, stadium signs, etc.). In many cases, this content is built into the game code (e.g., hard coded) along with the core content of the game and displayed consistently (e.g., at the same place/time) in the game. In other cases, in-game advertisements may be provided to the game through a network connection so that the advertisements can be provided for display in the game after the primary game code has been developed.

While such opportunities for allowing content within games potentially offer an amazing landscape for content providers to work with, current techniques for providing content providers with opportunities for presenting their content in games are limited and are often difficult to implement.

BRIEF DESCRIPTION OF THE DRAWINGS

FIG. 7 is a display diagram showing an example game application screen through which a user can select a supplemental soundtrack for presentation during game play.

FIG. 8 is a display diagram showing an example of a Game Over screen through which a user can select an option to purchase previously streamed content.

Figure 1A:
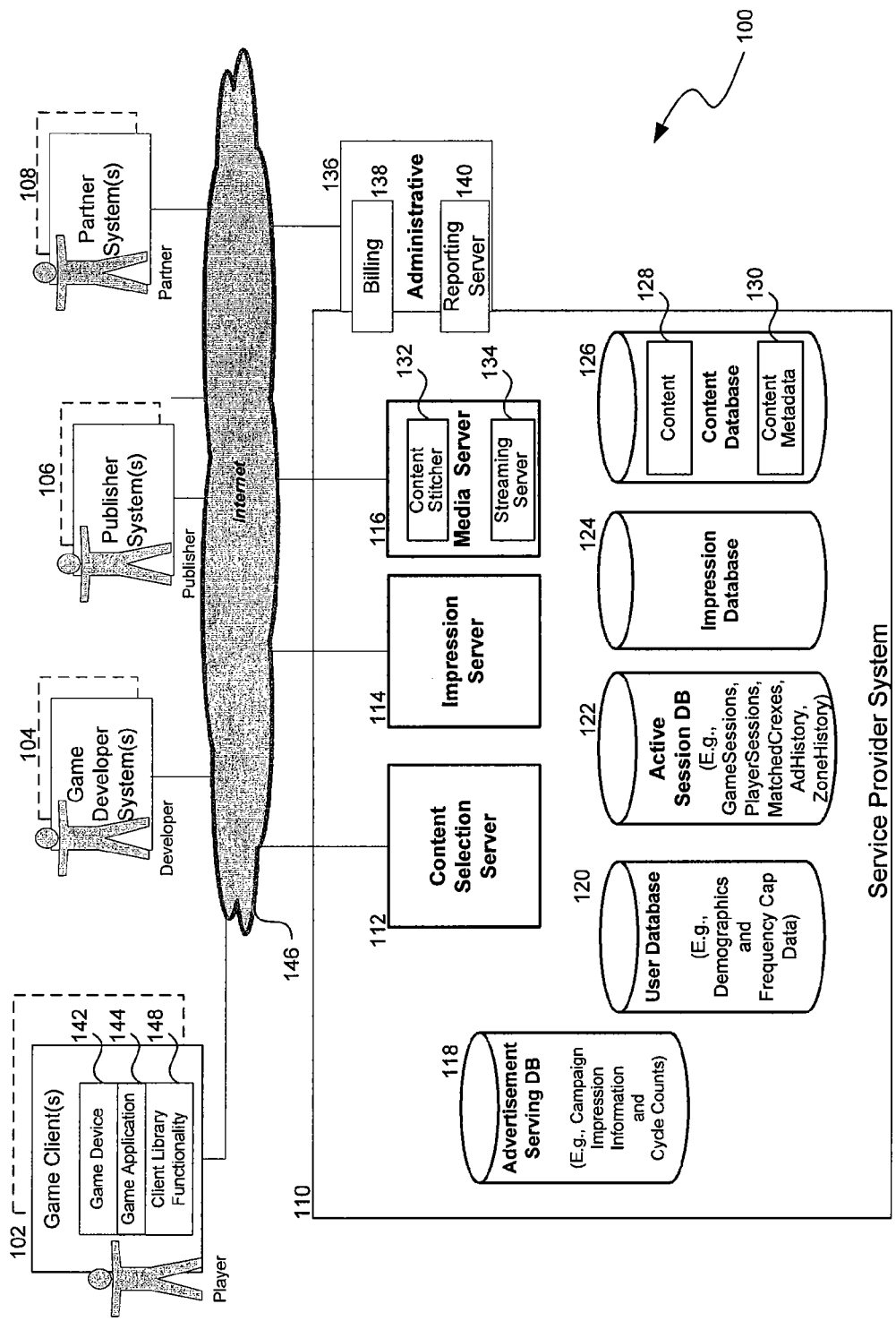
FIG. 1A is a block diagram that shows a sample architecture for the layout of a radio-casting, streaming media system.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

DETAILED DESCRIPTION

A streaming media "broadcast" or "narrowcast" system is described herein. The system can be used to deliver "casts" (e.g., music, programming, talk segments, news, advertisements, and other content including audio, video, holograms, etc.) into application environments. An example of such an application environment is a game environment comprising a video game played from a gaming console that includes a network connection to at least one remote system that is configured for providing one or more types of content that can be used within the application environment. Another example of such an application environment is an entertainment application running on a mobile device, or an application running in association with a web client. Within such application environments, the casts may be used as contextual elements, background elements, or optional elements within the application environment or as the primary focus of such environments.

In one example, audio insertion broadcasting can be utilized for allowing custom soundtracks in video games. A user may select custom music and a network connection can be used to stream an audio cast containing the custom soundtrack to the user's game console during game play via a network connection. In some cases, the game player selects the custom music from a list of options. It may also be possible for the user to import (e.g., from an independent storage device or web site) some of his or her own music into a custom playlist.

In another example, audio insertion broadcasting can be used to automatically offer new or revolving music sets during game play, so that the game player does not have to listen to the same game music every time the game is played. In some cases, the music may be selected for the game player based on previously specified interests, on game player behavior, and/or on game player demographic information. It is also possible to give the game player the option of purchasing music that is provided during game play (e.g., for later play by the user in a non-game context). For example, following a "Game Over" screen, a "Purchase Game Music" screen may be displayed to the game player. Alternatively, the game player may be able to, during game play, "mark" or otherwise indicate an interest in a particular song. Doing this indicates that the user wishes to hear the same song again while playing the game in the future and/or would like an opportunity to purchase the selected music sometime after game play.

The streaming media system will now be described with respect to various embodiments. The following description provides specific details for a thorough understanding of, and enabling description for, embodiments of the streaming media system. However, one skilled in the art will understand that the invention may be practiced without these details. In other instances, well-known structures and functions have not been shown or described in detail to avoid unnecessarily obscuring the description of the embodiments.

It is intended that the terminology used in the description presented be interpreted in its broadest reasonable manner, even though it is being used in conjunction with a detailed description of certain specific embodiments of the invention.

Certain terms may even be emphasized below; however, any terminology intended to be interpreted in any restricted manner will be overtly and specifically defined as such in this Detailed Description section.

I. Sample Environment

Referring to FIG. 1A, a suitable environment 100 in which aspects of the streaming media system may operate includes several interconnected systems including, for example, one or more game client systems 102, one or more game developer systems 104, one or more game publisher systems 106 (e.g., systems associated with entities that publish game titles and hold final approval in the content of the game), one or more partner systems 108 (e.g., systems associated with advertisers, music companies, or other entities that provide content to be streamed or otherwise disseminated to the one or more game client systems 102), and a service provider system 110 responsible for managing the streaming of media to the game client systems 102. The content to be streamed or otherwise disseminated to the one or more game client systems 102 may include advertisements, music, real time content (e.g., weather reports, sports scores, news headlines, etc.), or other information that may be dynamically delivered into games.

In general, the partner systems 108, game publisher systems 106, and game developer systems 104 may communicate with aspects of the service provider system 110 to manage the dynamic dissemination of content to the game client systems 102. For example, one or more of the game publisher systems 106 may link with various interfaces (not shown) of the service provider system 110. If appropriate, these interfaces allow the publisher to approve or reject content decisions made within the service provider system 110 and/or to view associated reports relating to content that was disseminated. In another example, the partner systems 108 may link with aspects of the service provider system 110 to provide content that can be stored at various data storage facilities of the service provider system 110 so that the service provider system 110 can easily organize, retrieve, and disseminate such content.

The service provider system 110 may include various components and services that facilitate the dynamic management and dissemination of content (e.g., advertisements and music) into games. In some embodiments, the service provider system 110 includes a content selection server 112, an impression server 114, and a media server 116, all discussed in more detail in the following paragraphs.

In some embodiments, the content selection server 112 is responsible for selecting content to provide to the one or more game clients 102. For example, the content selection server 112 may respond to requests received from a game client 102 when the game client 102 is ready to be served with content such as an advertisement, music, etc. In general, the content selection server 112 selects content to serve, such as music or advertisements, based on a variety of factors, including location, time of day, game player demographics, game play data, etc. For example, in selecting content, the content selection server 112 may use information retrieved from an advertisement serving database 118. The information that is retrieved from the advertisement serving database 118 may include "flight" information that describes the time frame/date range in which any particular advertisement or advertisement campaign is set to be available for presentation in games.

The content selection server 112 may also retrieve records from a user database 120 (e.g., demographic and login information for specific players) to select appropriate content to serve to a particular user or group of users. In some embodiments, the content selection server 112 may extract game player demographic information from the user database 120 upon receiving an indication of start-up of a gaming session. In addition to being used during content selection, the demographic information stored in the user database 120 may, for various reasons, also be of value to publishers, partners, etc.

The content selection server 112 may also utilize game data (e.g., stored in an active session database 122) to determine whether currently available content is appropriate for a particular game. This is one mechanism through which content can be matched to particular titles or genres of games. Details of a sample game network-based sample content selection/dissemination scheme are described with respect to FIG. 2. The active session database 122 may also include information that the content selection server 112 may use to determine appropriate timing and context for content delivery (e.g., some content is more effective or more suitable for situations where gamers have played a single game session for over 45 minutes—research has shown that showing a pizza ad later during a game session leads to more pizza purchases).

The impression server 114 of the service provider system 110 may record impression information related to tracking the content provided by the service provider system 110 that is actually presented to users at game clients 102. The impression information may include auditing information and other reporting data (e.g., ads or text viewed but not counted as an impression) and gaming data (e.g., average game session in minutes, number of live game sessions by day-part, geography, etc.). The impression server 114 may then write this information to an impression database 124. The impression server 114 may also update information about impression counts (e.g., for specific flights associated with the advertisement serving database 118).

While the content selection server 112 identifies the appropriate content to serve in a given situation, in some embodiments, it is the media server 116 of the service provider system 110 that facilitates actually providing/disseminating the identified content to the game client 102. In some embodiments, the media server 116 stores media files or has direct access to media files, such as media files provided by the partner system 108 and/or content files 128 and metadata files 130 stored in an internal content database 126 associated with the service provider system 110. This content may include music, advertisements, and other display/audio information that may be in the form of image files, audio files, video files, executables, etc. The content may also be arranged to comprise streaming audio and/or video programming. The media server 116 may then serve the media files to the game client 102 upon request. In the case of streaming content, a content stitcher component 132 associated with the media server 116 may be used to create or "stitch together" content streams that a streaming server 134 of the media server 116 may then provide in a continuous streaming format to the game client 102. In some examples, the streaming server 134 operates to send content streams using multiple packets that are configured for reassembly at the game client 102. An example of the protocol used in the transmission of packets by the streaming server 134 and receipt and assembly of packets at the game client 102 is Realtime Transport Protocol (RTP). However, other protocols are possible.

The service provider system 110 may also include an administrative component 136 having a billing component 138, a reporting server 140, and possibly other components (e.g., matching and targeting administrative access and general system maintenance—not shown). The reporting server 140 may be configured to receive audibility metrics and user marking data and record this for user profile creation in some embodiments (described below). The reporting server 140 may also be used for tracking user interest in content (e.g., as indicated by users via marking activities or other activities) and directing interest-specific offers to such users.

Each of the one or more game clients 102 may include a game device 142 (e.g., a console, computer, portable game device, etc.) on which a game application 144 executes. The game device 142 may request and receive content from the service provider system 110 and may be configured to establish communication via a communication link, such as the Internet 146 or a wireless communication network. To facilitate communication with the service provider system 110, the game application 144 may include integrated client library functionality 148 that handles connections and data exchange, for example, with the game publisher system 106. In some embodiments, the client library functionality 148 is initially incorporated into the game application via exchanges of information between the game developer system 104 and the service provider system 110. During this process, the game developer may specify memory management and file access parameters for use by the client library functionality 148. Accordingly, in terms of memory and processing resources, the functionality associated with the client library functionality 148 may maintain a low profile in the game device 142.

Figure 9:
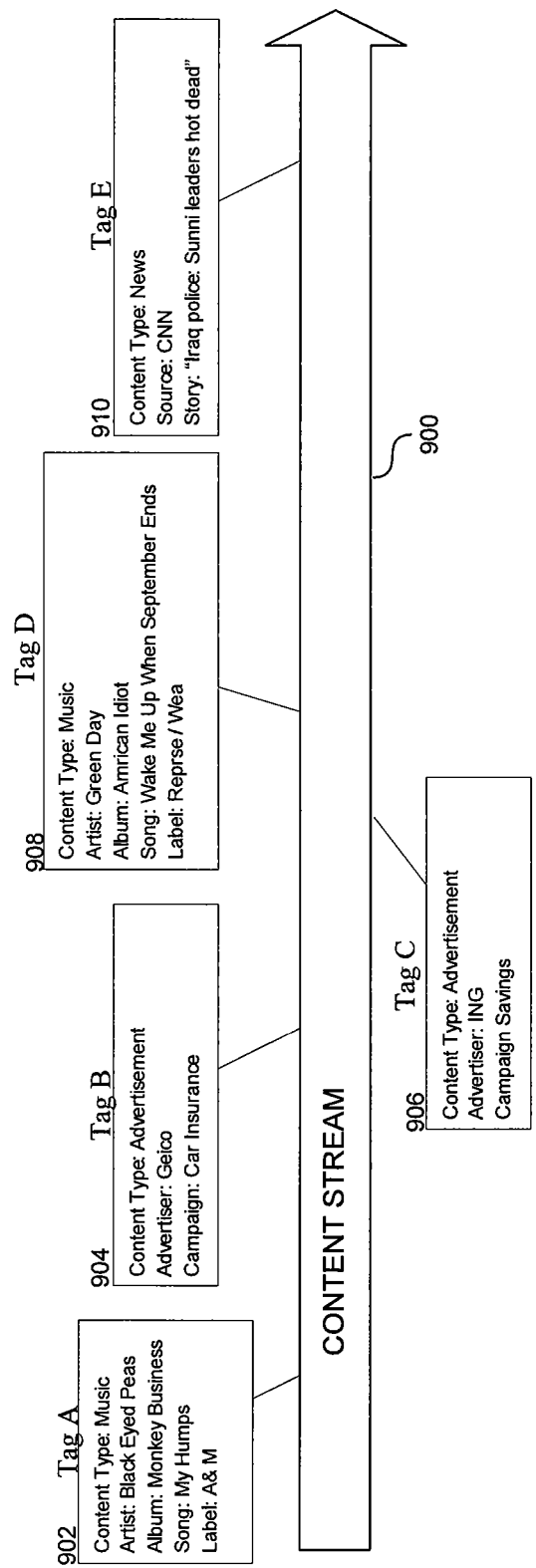
FIG. 9 is a block diagram showing a sample of a stream, and tagged data within the stream.

Via aspects of the client library functionality and/or other functionality at the game client 102, the game client 102 is configured for receiving cast streams. For example, the game client 102 may support streaming media and provide an interface that can populate an in-game sound/video buffer. Additionally, the game client may be configured to support the extraction and interpretation of metadata associated with the cast streams (e.g., through the use of metadata tagging, which is described in more detail with respect to FIG. 9). In some embodiments, the game client 102 is also configured to provide an interface that allows a client host application to provide reporting metrics (described in more detail below). These reporting metrics can be applied to the currently playing stream and segment/unit of that stream, while also calculating impression durations.

Where the game client 102 is associated with a PC or mobile device, an external client (with user interface and keyboard shortcuts) may allow users to listen to casts outside the original game environment through which the cast was originally provided. In this way, for example, the user can listen to the cast while playing other games, or even when using other applications on these devices. Accordingly, the system can provide a single radio solution across both in-game and out-of-game environments.

For "offline play" the game client 102 is not constantly communicating with the service provider system 110. In such a scenario, the game client 102 may connect to the service provider system 110, start a session, request and retrieve flights and media, and cache this information locally. As the game is played, the game client 102 may record and cache view and impression information. Later, when the game client 102 reconnects to the service provider system 110, it contacts the impression server 114, flushes all cached view and impression data, and then ends the session.

During various scenarios, it may be possible for content, including streamable content, to be downloaded "in the background" during times when the game client 102 is connected to the service provider system 110, including when the game device 142 is performing other tasks, such as executing a different game, operating a web browser, etc. Various applications that run quietly on the game client 102 may be responsible for downloading the content during such times without requiring active user involvement. In another scenario, player incentives for actively downloading content during non-play time may also be provided. For example, a player may accept to actively download advertisements or music in exchange for receiving a desirable upgrade to the game (e.g., a new weapon, game hints, new game levels, new game characters, etc.). Alternatively, the service provider system 110 may provide advertisement data by alternative means/media, such as CD-ROM, cable connections, satellite, telephone line, etc.

In some embodiments, the game developer system 104 and the service provider system 110 may communicate to incorporate at least a portion of the client library functionality 148 into a game title, which may include having the developer specify the availability of available ad units within specific game titles.

In general, any of the computing devices described herein may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

Embodiments may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 1B:
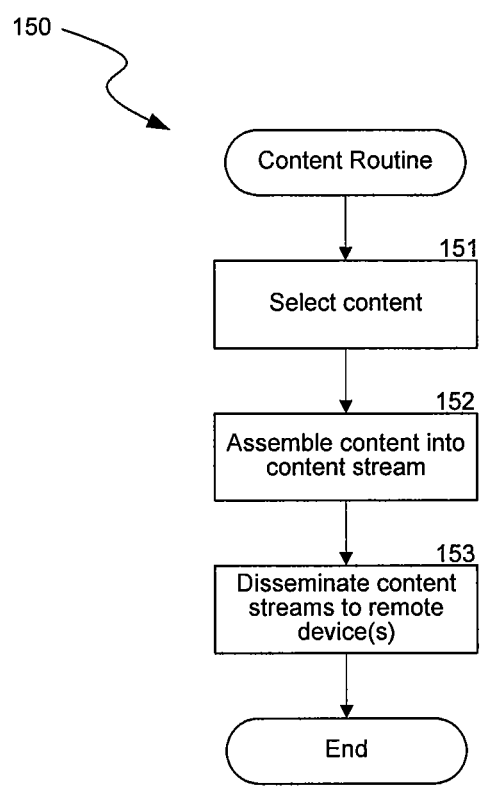
FIG. 1B is a flow diagram showing an example of a high-level routine at the service provider system of FIG. 1A.

FIG. 1B is a flow diagram illustrating a content selection, assembly, and dissemination routine 150. The flow represented in FIG. 1B is a high-level flow, with some of the individual processes or subtransactions described in more detail in the Figures that follow. This representative flow diagram (along with the flow diagrams of FIGS. 2, 3, 5, and 6) shows processes that may occur within the system of FIG. 1A but does not show all functions or exchanges of data. Instead, FIG. 1B and FIGS. 2, 3, 5, and 6 provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

At block 151, the routine 150 selects content to be streamed to a game client 102. In some embodiments, the content selection is managed by the content selection server 112 of the service provider system 110. The selected content may include dynamically selected/custom content (narrowcasting scenario), pre-selected or randomly selected content intended for a broader audience (broadcasting scenario), or a combination of both dynamically selected/custom content and content intended for a broader audience. Details of content selection in various scenarios are described below with respect to FIGS. 2-5.

At block 152, the routine 150 assembles the content into one or more content streams, which may be performed at the media server 116 of FIG. 1A, which includes the content stitcher component 132. At block 153, the routine disseminates the content streams to one or more remote game clients 102, an action that may be performed by the streaming server 134 associated with the media server 116 of FIG. 1A.

II. Broadcasting and Narrowcasting Streamable Content

In some embodiments, the system uses various techniques for delivering streamable content (e.g., casts) to video games. For example, the system may use a first technique, called broadcasting, to send the same programming, simultaneously, to two or more unrelated game clients. The system may use a second technique, called narrowcasting, to provide dynamically selected content to an individual game client (or multi-player session) in response to user requests for media.

With the broadcasting technique, selecting and scheduling content may be similar to selecting and scheduling content in a traditional radio broadcasting environment. For example, the broadcasting system may provide a number of "channels" from which consumers/listeners can select, with each channel specializing in a different genre of content (e.g., specific musical/topical foci). With the broadcasting model, the content available through each channel is pre-selected and arranged (either by programming directors or automatically), and all consumers/listeners receive the same content at the same time when listening to the same channel. Thus, a user can select the "channel" that he or she wants to listen to, and these channels could have specific musical/topical foci and are scheduled like current AM/FM radio channels. In this way, it is possible to minimize the server resources used to deliver content (e.g., as a result of broadcasting via a single channel and not needing to run dynamic matching/program generation algorithms for individual users). In addition, the use of broadcasting techniques in a video game environment allows for straightforward scheduling of delivered content. One way in which broadcasting can allow for an enhanced user experience is by providing consistent programming schedules that allow users to "tune in" for their favorite content at specific times and plan accordingly. In another example, the broadcasting techniques allow for the introduction of human DJs and personalities.

Figure 2:
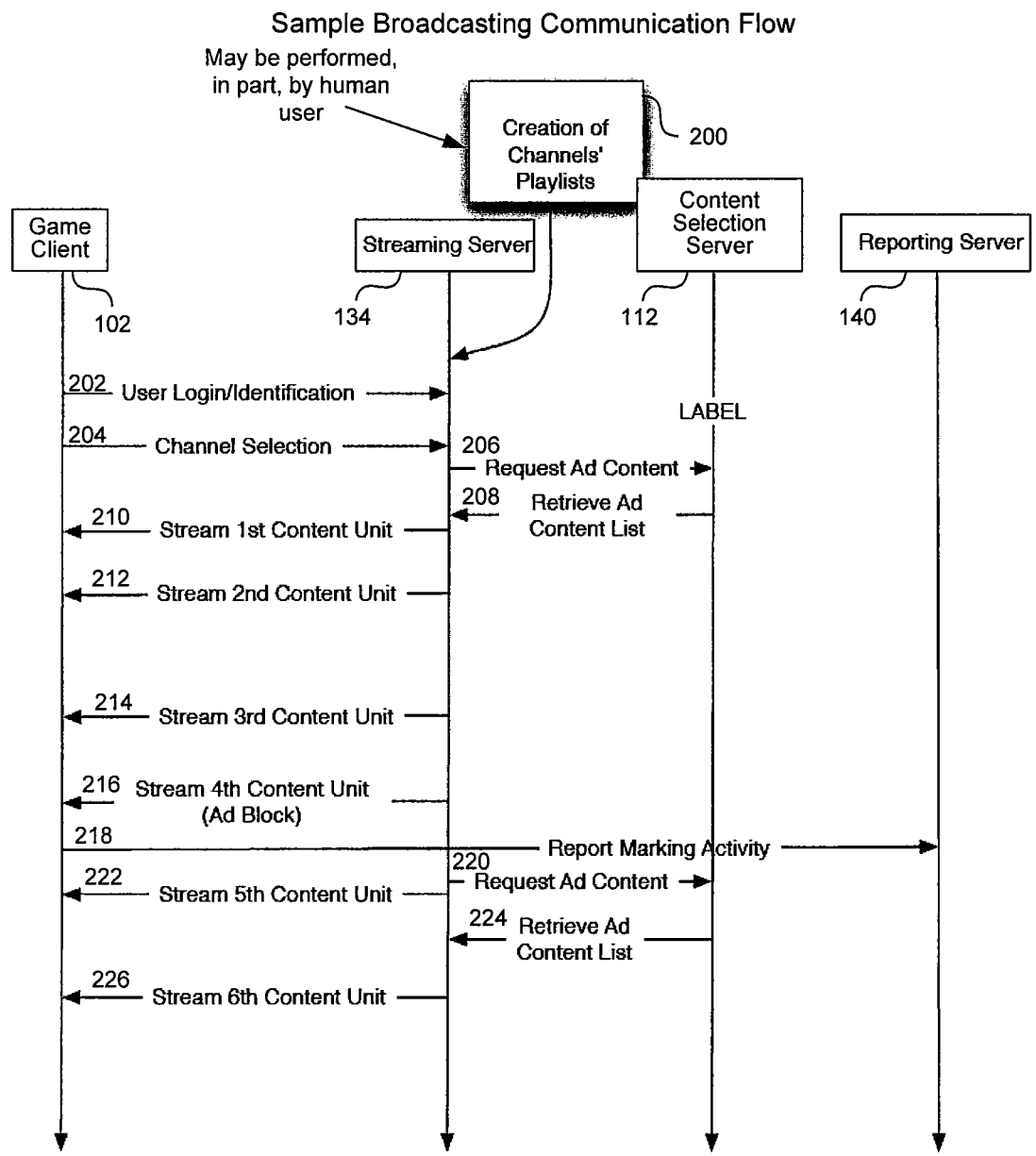
FIG. 2 is a flow diagram showing an example of a communication flow for broadcasting.

An example of a communication flow associated with a broadcasting model in one sample embodiment is depicted in FIG. 2. In the illustrated example, the entities involved in the flow of communication include several components initially depicted in FIG. 1A, including a game client 102 (e.g., game client), a streaming server 134, a content selection server 112, and a reporting server 140. In this model, at least some of the content to be streamed to the game client 102 includes prearranged content 200 (e.g., in the form of playlists), while other aspects of the content will be dynamically selected. There are many ways that providing custom content (e.g., advertisements) in association with prepackaged content streams can be implemented in the broadcasting scenario. For example, it may be possible to specify certain segments of a prepackaged broadcast stream as "ad content." In this implementation, the streaming server 134 employs the content selection server 112 to select content to place in the stream for each individual user/user group (e.g., based on stored demographics information). In this way, each user (or group of users) receives unique/targeted advertisement (or other content).

In some embodiments, customization of aspects of streamed content may be possible in a broadcasting environment through the use of empty inventory elements in the prepackaged game application, which, for example, may represent one or more empty spaces or slots into which custom advertisements or other custom content may be dynamically inserted to target individual users or user groups (e.g., users within a geographic area). Sample scenarios for selecting/matching such content are described with respect to FIGS. 4 and 5.

In the sample broadcasting scenario illustrated in FIG. 2, the game client 102 begins by providing user login/identification 202 (optional) and channel selection information 204 to the streaming server 134, indicating the start of a game session. The streaming server then requests content 206 (which may include both static and dynamically selected content) from the content selection server 112. The content selection server 112 provides the streaming server with a content list 208 including one or more content units, which can be part of either prepackaged content or dynamic/custom content). The content units are then streamed from the streaming server 134 to the game client 102. The game client 102 receives content streams of content units (210, 212, 214, and 216) from the streaming server 134, which can then be presented to the game player before, during, and/or after game play.

If at any time the game player marks any of the streamed content as may be provided for in some embodiments (e.g., by providing certain game controller input), the game client sends an indication of report marking activity 218, which is passed to the reporting server 140, which may manage tracking, monitoring, marking, and various types of reporting activities. At any point in the process, the streaming server 134 may send to the content selection server 112 an additional request for dynamic content 220. As before, the content selection server 112 responds to this request by sending a content list 224 back to the streaming server 134, which continues to send additional content units (222 and 226) to the game client 102.

With the second technique for delivering casts to applications such as video games and mobile device applications, called narrowcasting, the system performs content scheduling in an automatic and dynamic way. This provides several advantages, including allowing custom programming, geared to the user's tastes/preferences and the ability to add "subscription" type services for greater customization. Content (which can include advertisements as well as music, video, audio, and/or other programming) is selected in real time for a particular user/game session, and delivered to an individual user (or game session).

Figure 3:
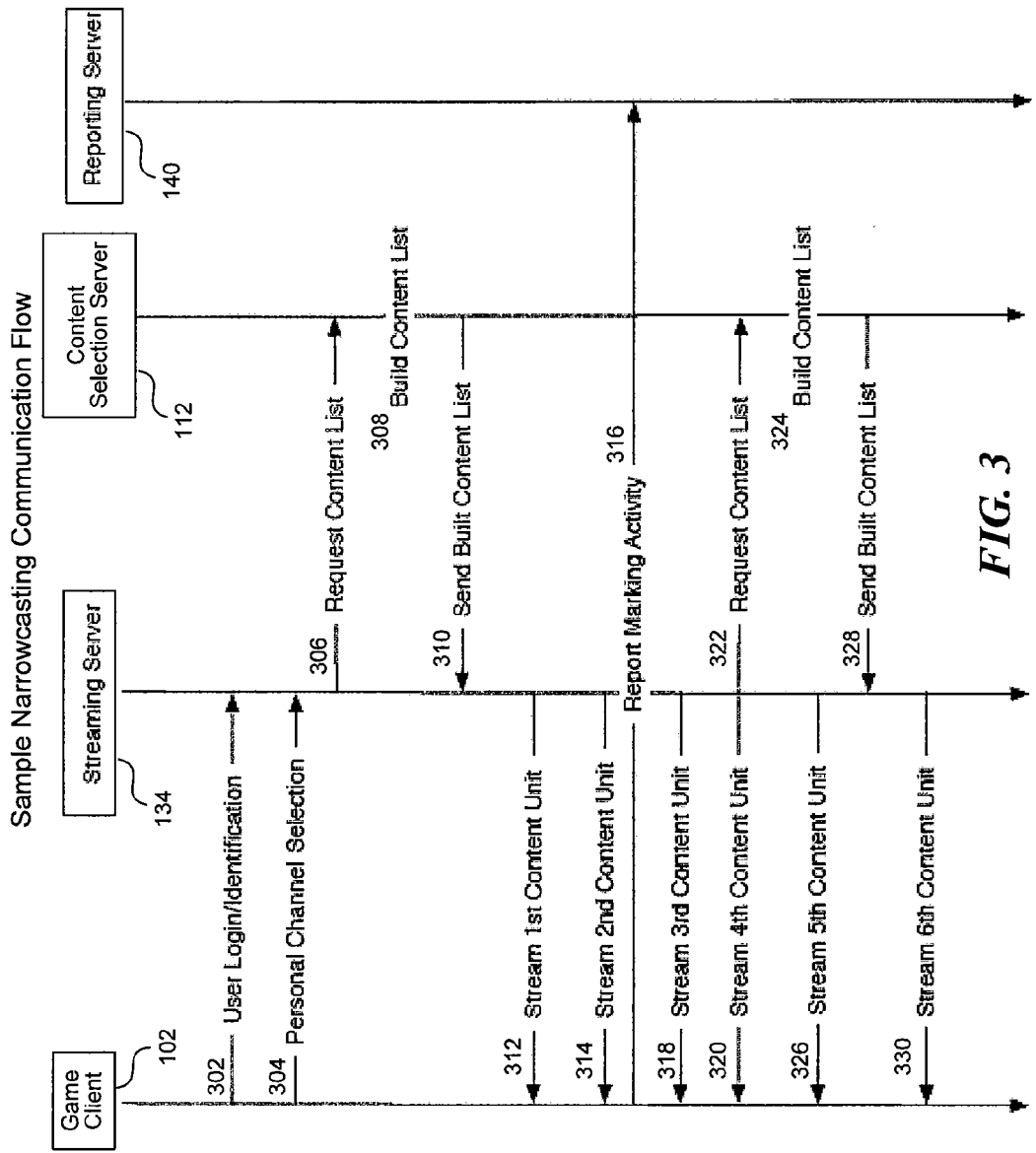
FIG. 3 is a flow diagram showing an example of a communication flow for narrowcasting.

An example of a communication flow associated with narrowcasting in one sample embodiment is depicted in FIG. 3. The entities involved in the flow of communication include a game client 102, a streaming server 134, a content selection server 112, and a reporting server 140. In the illustrated embodiment, the user contacts the streaming server (e.g., by providing user login information 302 and/or personal channel selection 304). Now informed that the game client 102 is associated with an active game session, the streaming server 134 requests a content list 306, from the content selection server 112. Subsequent content list requests 322 may be sent from the streaming server 134. The content selection server 112 manages selection and scheduling of content, including building content lists (308 and 324) after receiving content list requests (306 and 322). The content selection server 112 sends built content lists (310 and 328) to the streaming server 134 for dissemination. The game client 102 receives the content streams (312, 314, 318, 320, 326, and 330) from the streaming server 134 and is configured to present the streamed content to a user of the game client 102. In some embodiments, tracking, monitoring, marking activities, and/or other types of reporting activities (described in more detail below) may be managed by the reporting server 140.

With narrowcasting, customization of content may be possible on a user-by-user basis (e.g., by providing one or more interfaces allowing a user to make custom decisions about the specific content or channels he or she wishes to access and/or providing one or more interfaces allowing a user to indicate preferences, rate content, mark content, etc.). For example, each user may have a set number of channels allowing him or her to divide his or her preferences and create multiple listening opportunities, each embodying a unique psycho-graphic/taste profile/mood of the user. As illustrated in more detail with respect to FIGS. 4 and 5, the content selection server 112 may select content for the user algorithmically, e.g., based on information about the particular game session and/or based on user-specific information (e.g., a user's specified preferences or a user's past response to content).

III. Content Selection and Matching

Figure 4:
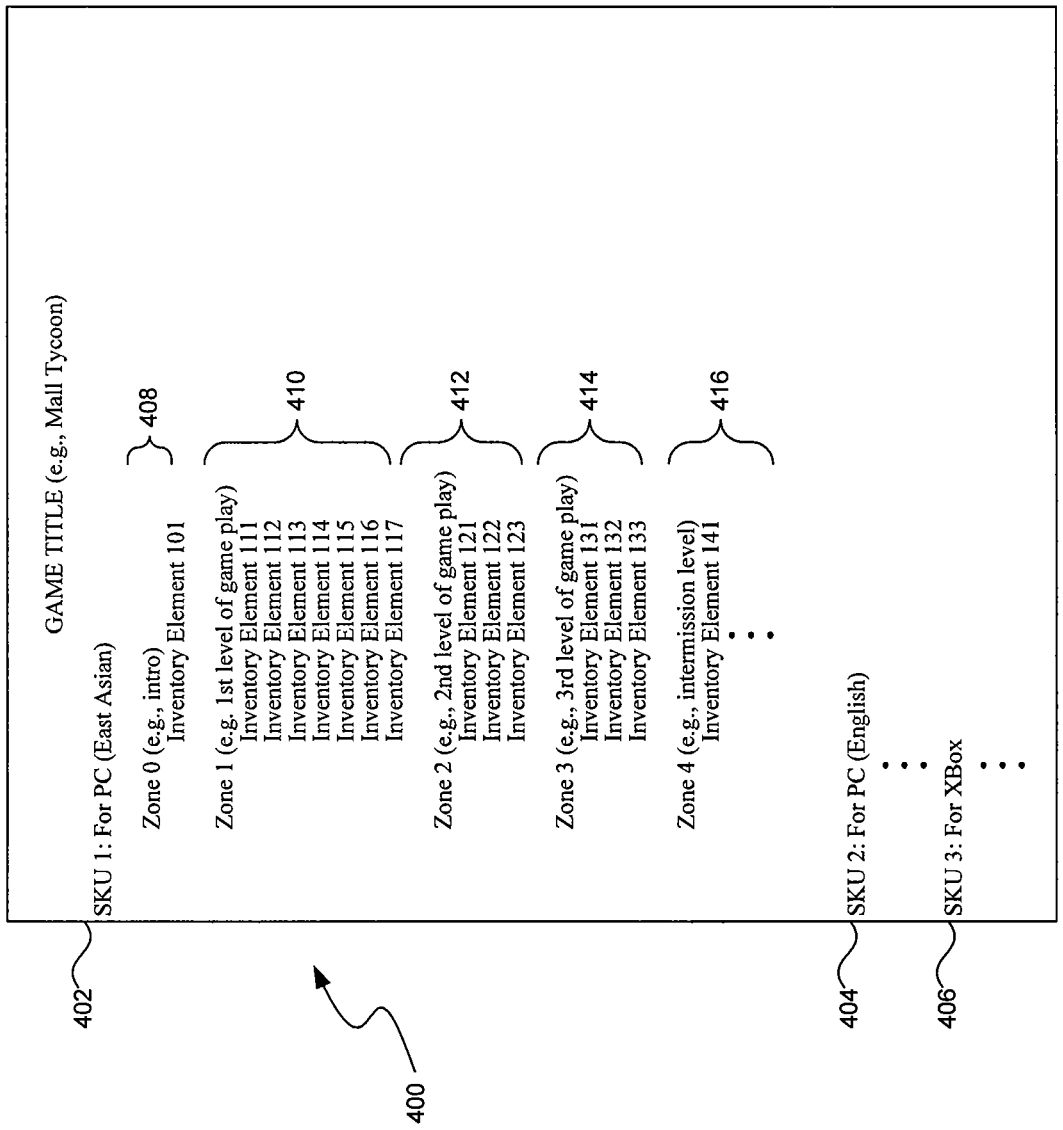
FIG. 4 is a display diagram showing an organization of available inventory elements within a particular game title, which can be used for content selection by the content selection server of FIG. 1A.

The service provider system 110 may utilize one or more content selection schemes to ensure content selection that is appropriate for a given game application. One such scheme involves the consideration of content units/inventory elements that are available in a given game application. FIG. 4 provides an example of the organization of available content units/inventory elements within a particular game title 400. The game title 400 (e.g., Mall Tycoon) includes three SKUs (402, 404, and 406), with SKU 1 402 shown in more detail. In some embodiments, a SKU represents a specific version of a title, differentiated from other versions of the title by platform, language, geographic distribution, format (e.g., PAL/NTSC), or other features. One title may have multiple SKUs worldwide. In the illustrated example, SKU 1 402 includes at least five zones (408, 410, 412, 414, and 416) with each zone representing a positional or functional area within a game environment (e.g., groupings of particular game content, game audio features, game levels, in between game levels, game introduction, game ending, etc.). Each zone (408, 410, 412, 414, and 416) then includes its own inventory elements/available content units through which streamable content may be presented during game play. In the context of this particular example, some matching considerations (e.g., in Boolean form) might be as follows: "SKU 1 or SKU 2," "SKU 1 and Males," "Inventory Element 123 and Males and Tuesday."

For implementation purposes, an inheritance relationship may be present among the various components of a game structure associated with a game title, such as the game title 400 described above. For example, there inventory elements may inherit attributes from zones, zones may inherit attributes from SKUs, and SKUs may inherit attributes from game titles. Each inventory element in the zone may be associated with certain information that allows it to be associated with particular content at some point down the line. This may include information such as the size and shape of the inventory element, the format of the content the inventory element takes, and keywords or other information associated with the inventory element (e.g., suggesting a theme associated with the inventory element as it relates to the game).

In a dynamic matching scheme, a matching process matches currently available content to available content units/inventory elements associated with active game sessions. This matching may involve a binary decision: content either matches an inventory element or does not. This matching may be based on known technical parameters of the currently available content units/inventory elements (e.g., whether it is possible to configure the content to fit inside and/or function properly within a particular available content unit/inventory element). In the case where some or part of the content is not selected by the user, the matching for at least some of the content may be based on targeting criteria provided by the content providers. In general, targeting may be publisher-/content-driven, player demographic-driven, advertiser-driven, game play behavior-driven, or environment-driven. Examples of targeting criteria used in matching include explicit inventory targeting (e.g., targeting specific titles, SKUs, zones, available ad units/inventory elements, etc.), date range targeting (e.g., from time A to time B), time of day targeting (e.g., afternoons only), day of week targeting (e.g., only Saturdays), targeting by genre (e.g., racing games, sports games, etc.), targeting by platform (e.g., PC users, XBox users, etc.), targeting by ESRB rating, targeting by keyword, frequency caps, by game play date (e.g., once 45 minutes of game session have passed), etc.

Player-specific information may also be used for targeting, and may include player geographic information (e.g., country, region/state, city, and Direct Marketing Associate (DMA) areas), and player demographics (e.g., gender, age, purchase history, etc.), and game play behavior (e.g., play 80% of time on weekends, play sports titles and racing only, play for average of 4 hours per game session, etc.). In addition to explicitly provided player-specific information, player-specific information may also be derived using marking techniques (e.g., providing an interface that allows a user to mark select content in real time—while the user is listening). Specific examples of such marking techniques are described in more detail below with respect to FIG. 6. The preferences of the user may be extended to include preferences of users that have marked the same or similar content as the user. Additionally, content experts can assign taste propinquity to new content to help launch new media within the system.

User-specific information may also be derived based on a game player's IP address and may include geographic information (e.g., postal/zip code, area code, longitude, and latitude), root domain (e.g., .edu vs. .com), and specific domains/ISPs (e.g., *.aol.com). Many other data collection techniques are possible, some of which may be implemented by tracking the activities that occur in association with a game-playing device. It may be possible to obtain player-specific information from other sources, such as partner databases.

In addition to targeting based on user-specific information, other targeting scenarios may be used in the dissemination of content including targeting by game network (e.g., target the "EA Sports" network), targeting by client version, targeting based on multiplayer participation, targeting by arbitrary user list (e.g., specific player IDs are collected into lists based on demographic or other criteria: "All player IDs known to have played a car driving game might be shown Toyota advertisements in a different game."), OS or hardware versions, etc.

In general, targeting may involve inclusions (e.g., all sports games), exclusions (e.g., no games with "blood" as a keyword) or a combination of both (e.g., in the evenings but not on Tuesdays). Although the advertiser primarily makes the decision about what targeting to use, many types of targeting criteria revolve around how the publisher has classified its inventory. Various specific examples of targeting criteria are discussed in detail in commonly owned PCT Patent Application No. PCT/US2005/008274, filed Mar. 8, 2005, entitled "Delivery of Advertising into Multiple Video Games."

In some embodiments, the content selection server can also take into account "play goals" when selecting content for play, allowing new content to be served in a higher rotation than standard library content for periods of time (new show launch, album launch dates, etc.). This may apply in either a broadcasting or narrowcasting context. While specific factors used in selecting content are described above, the system may also consider other factors or a combination of factors when determining which content to serve. For example, based on a combination of factors, the system may produce a derivative score or ranking for each item of content and use these scores/rankings to select content to be served into the stream.

Figure 5:
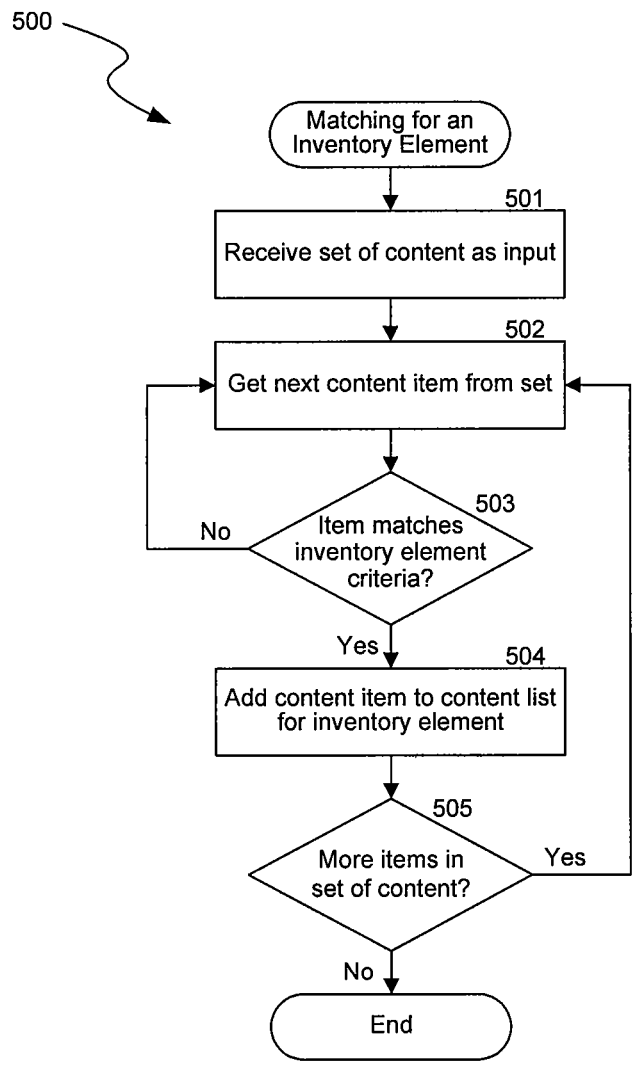
FIG. 5 is a flow diagram showing an example of a routine for inventory element-based content matching used by the content selection server of FIG. 1A.

Referring to FIG. 5, a matching routine/algorithm 500 may take place in a content selection server, such as the content selection server 112 of FIG. 1A. The matching routine 500 may begin at block 501, where it receives a set of content items as input to match to a given inventory element. At block 502, the routine 500 may get the next content item from the set received at block 501. At decision block 503, the routine 500 checks whether the content item matches criteria associated with the inventory element. If at decision block 503 there is not a match, the routine 500 loops back to block 502 to get the content item from the set. If, however, at decision block 503 there is a match, the routine continues at block 504. At block 504, the routine 500 adds the matched content item to a content list. At decision block 505, the routine 500 checks whether there are additional content items in the set of content. If there are additional content items, the routine 500 loops back to block 502 to get the next content item from the set. However, if at decision block 505 there are no further content items in the set, the routine 500 ends, and is possibly followed by a content stitching routine so that a stream of content can be assembled containing the matched content.

As a variation of the matching scheme described with respect to FIG. 5, it may also be possible to use indexes for matching. The indexes may be prefabricated and use a fundamental targeting property to winnow the list of content items to a small set of content items. Use of such an index may minimize the use of loops in the matching routine 500. For example, the index might be a mapping from a SKU ID to a list of currently matching content items. In some embodiments, a batch process may recalculate such an index every hour or so.

Because the matching process described above may result in more than one content item per available inventory element at any given time, a relative scoring scheme may be implemented to select one or more content items for display for a particular available inventory element. The relative scoring scheme may be based on several factors, such as prioritization, scheduling, and optimization. Generally, relative scoring may involve calculating a score for each available content item. Relative scoring may optionally be performed as a second process performed on the list of matched content (e.g., executing a score function on each advertisement and then sorting the list based on the score). A sample relative scoring scheme is described in commonly owned PCT Patent Application No. PCT/US2005/007782, filed Mar. 8, 2005, entitled "Matching and Scoring of Advertisements for Targeted Delivery into Multiple Video Games, Such as Single and Multiplayer Games."

IV. Custom Soundtracks

Figure 6:
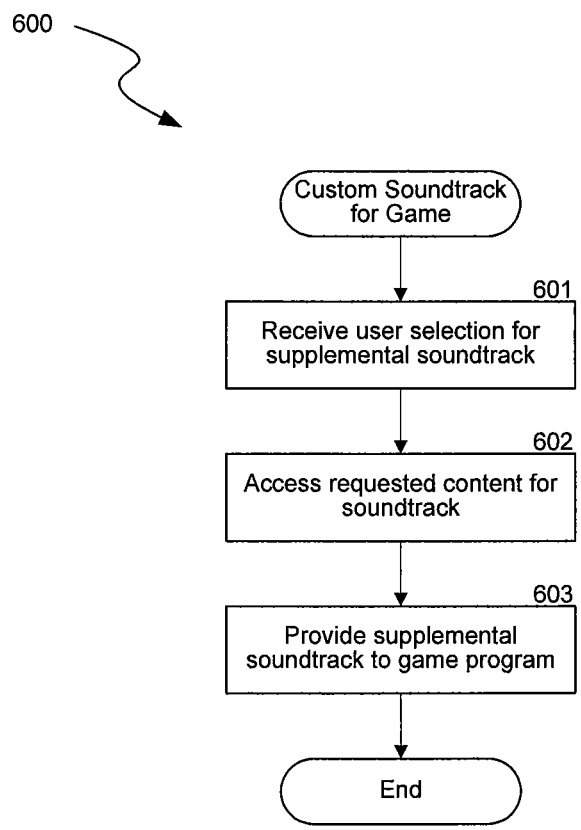
FIG. 6 is a flow diagram showing an example of a routine for providing a supplemental soundtrack via a streaming media system.

Referring to FIGS. 6-8, in some embodiments, audio insertion broadcasting can be utilized for allowing the use of supplemental soundtracks in video games. Such supplemental soundtracks may replace existing soundtracks that are hard coded into a game program (which a user may tire of after repeated game play). FIG. 6 is a flow diagram showing a routine 600 at a service provider system that allows for the streaming of user-selected supplemental soundtracks for presentation during game play. At block 601 the routine 600 receives an indication of a user selection for a supplemental soundtrack. A sample user interface for allowing a user to select such a supplemental soundtrack at the game client (e.g., immediately prior to game play) is provided in FIG. 7. As shown in FIG. 7, the user may have the option to select one of several preassembled soundtrack options 702. The user may be able to select a CUSTOM SOUNDTRACK option 704 that allows the user to piece together a personalized soundtrack using various songs from a provided song list. An IMPORT CUSTOM SOUNDTRACK option 706 may also be available, through which the user can import songs to the service provider system from his or her own collection.

Once a user has selected the supplemental soundtrack and the selection has been transmitted to the system, at block 602, the routine 600 accesses the requested soundtrack (or information the content used to piece together a customized soundtrack). At block 603, the routine 600 streams an audiocast containing the supplemental soundtrack to the game client via a network connection. In some cases, the supplemental soundtrack is streamed to the game client in near real time during game play, for immediate presentation. In other cases, the supplemental soundtrack may be persistently stored at the game client for future use.

In this way, audio insertion broadcasting may be used to offer new or revolving music sets during game play, so that the game player does not have to listen to the same game music every time the game is played. In some cases, the service provider system may automatically provide new game music to the game client. In some cases, this automatically provided game music may be a broadcast available to many users, which is based on a preassembled playlist or on a random selection. In other cases, the automatically provided game music may be based on game session-specific and/or player-specific information.

As shown in FIG. 8, it is also possible to give the game player the option of purchasing music that is provided during game play (e.g., for later play by the user in a non-game context). For example, a "Game Over" screen 800 may have a button 802 which a game player can select if he or she wishes to purchase music played during the game. Based on selection of this button 802, a "Purchase Game Music" screen (not shown) may be displayed to the game player. Alternatively, the game player may be able to, during game play, "mark" or otherwise indicate an interest in a particular song. Doing this indicates that the user wishes to hear the same song again while playing the game in the future and/or would like an opportunity to purchase the selected music sometime after game play.

The user interface screens or web pages described herein (e.g., with respect to FIGS. 7 and 8 above) provide facilities to receive input data, such as a form with fields to be filled in, pull-down menus or entries allowing one or more of several options to be selected, buttons, sliders, hypertext links, or other known user interface tools for receiving user input. While certain ways of displaying information to users is shown and described with respect to certain Figures, those skilled in the relevant art will recognize that various other alternatives may be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other) where the layout and information or content to be displayed on the page is stored in memory, database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector-generated), or matrix or bit-mapped formats. While aspects of the invention are described herein using a networked environment, some or all features may be implemented within a single-computer environment.

V. Tracking Delivery of Content

One way in which the delivery and presentation of content can be tracked is through the use of tagging. Tagging is especially useful when dealing with content streams, due to the continuous nature of streamed content. For example, tagging allows for identifying portions/units of the stream as being specific content from specific sources. In particular, tagging may be used to identify separate units of currently playing content as separate units (e.g., for reporting purposes). Additionally, data associated with tagging can be used to provide metadata about the audio content being delivered (e.g., "Song Title," "Artist," "Copyright," etc.), which can be presented to the user. An example of tagging is illustrated with respect to FIG. 9, which shows a sample of a content stream 900 and tagged data within the stream. In this example, the tagged data (902-910) exists within the content stream 900 for the complete length of the content it is describing.

Tagging need not be XML-type tagging, but may instead be information (meta-data) describing content that appears in line, with streaming data. Therefore it may be a binary format. This tagging data is retrievable and transmitted at the beginning of each segment (or when a segment is joined by the user). The format of this tagging data is unimportant, as long as it can be recovered and interpreted by the client device. This is to provide the client device with descriptions of what is playing at any time. This tagging data need not be a header to the streaming data, which could provide long gaps where new listeners did not have the information. Instead it is sent in parallel with the stream, so users can join mid-stream and still receive the tagging data.

The system can specifically provide advertiser/campaign/offer IDs for advertising. This can be useful for interactions to identify what users are interacting with so the users can respond. Having the ability to track the delivery and presentation of content may be desirable in either broadcasting or narrowcasting environments. For example, tracking information provided from, or exchanged with, users can be used to generate ratings as well as for billing for the delivery of specified content (e.g., ads).

VI. Presentation Metrics

As the audio stream could be used in a variety of situations, such as where the cast is extra-environmental or ambient or where it is within the context of the games and tied to particular objects (an audio source), it may be desirable to be able to judge its presentation to the user and ensure that the user has heard the content being presented. To provide this functionality, a metric may be used to estimate the audibility of the presented content. "Falloff" is an example of a metric that can be used to measure audibility. Falloff represents the audible distance a "listener" is from the source of audio within the game. A falloff value of "0.0" corresponds to the listener being within a range where the audio is at its maximum volume. A falloff value of "1.0" represents that the audio is at or exceeding a distance at which it can no longer be heard. At a falloff value between "0.0" and "1.0," the volume falls off at a geometric, rate. In general, reporting the falloff number allows for approximation and reporting of audibility of the cast stream within the game environment.

The tracking described above may involve including information about the specific unit/segment (identified using tagging data), along with the duration for which that segment was presented as part of the tracked data. The combination of these metrics provides a clear representation of the presentation of units/segments to the user.

The tracking metrics are analogous to impression tracking with advertisements. Tracking may occur by periodic (e.g., timed) impression reporting updates. As this is not necessarily performed in an environment where the client device is "ticked" the client device may be responsible for calling a function that returns/populates the metric information. This call may be performed at varying intervals.

VII. Marking and Associated Interfaces

User marking of select content may be implemented using one or more interfaces (e.g., web interfaces or other types of interfaces). For example, a quick/simple (e.g., single-button) interface may be defined for marking content. As described above, marking and similar techniques allow users to respond to content they are listening to in a real-time fashion. In some embodiments, a marking command interface is defined and provided by the developer of the application that incorporates the casting technology. For example, the technology may supply standard calls to enable marking of content.

As a result of a user marking content that is being played/presented, the server supplying the cast stream or a separate server is notified. For example, a message may be sent from the client to the server. This message identifies the user and the content that has been marked. The server stores this marking information. In one example, the server uses the stored marking information for billing purposes (where marking content triggers a billing event) or for notifying content originators of the mark/interest expressed by a user. In the case of advertising content, the marking information can be used to allow advertisers to contact users who expressed interest in their company/product/service. For other forms of content, the marking information can be used to extend offers to purchase content-related merchandise (e.g., CDs, DVDs, T-shirts, etc.) to users who have marked a song, or other audio segment.

In addition to facilitating the marking of content, the one or more interfaces provided at the client may provide granularity to mark content the user has not yet been presented with (e.g., content that the user would or would not like to be presented with in the future). This allows users to use known content to help build an initial psycho-graphic profile for future use. Additionally, the one or more interfaces may allow for more granular rating of marked content to allow users to register strength of feeling for particular content. An example would be rating content on a scale of 1 to 5 where 5 is the most preferred and 1 is the least preferred. The one or more interfaces may also provide advertisers an extra-game/client opportunity to present users with targeted and more detailed advertising opportunities.

VIII. Conclusion

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

All of the above-mentioned patents and applications and other references, including any that may be listed in accompanying filing papers, are incorporated herein by reference. Aspects of the invention can be modified, if necessary, to employ the systems, functions, and concepts of the various references described above to provide yet further embodiments of the invention. These and other changes can be made to the invention in light of the above Detailed Description. While the above description details certain embodiments of the invention and describes the best mode contemplated, no matter how detailed the above appears in text, the invention can be practiced in many ways.

Details of the streaming media system may vary considerably in their implementation details, while still be encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for providing content during video game play to a user, the system comprising:
a content providing system configured for providing, via a network connection, streamable content including musical content to a game program executing at a remote computing device, the game program having zones representing functional areas within a game environment of the game program, each zone having an inventory element, wherein the streamable content is for presentation during game play and is supplemental to core game content provided by the game program, the content providing system including:
a content accessing component configured to access musical content for use as streamable content;
a content selection component configured to select musical content accessible by the content accessing component for use in one or more content streams,
wherein the content selection component is configured to receive user-specific information from the game program, the user-specific information including an identifier of the game program, a current zone within the game environment, and an inventory element within the current zone
wherein the content selection component is in communication with a data store storing information about the game program including aspects of the core game content provided by the game program, and
wherein the content selection component is configured to make musical content selection determinations based, at least in part, on the information about the game program and, at least in part, on the user-specific information;
a content assembly component configured to assemble selected content into one or more content streams;
a content dissemination component configured to disseminate one or more content streams to the remote computing device on which game program is executing for playing of the one or more content streams during game play within the current zone of the game program;
a component configured to receive from the remote computing device audibility metrics indicating audibility of content streams to the user and to track whether content streams were heard by the user, the audibility metrics indicating audible distance of a listener from a source of the audio within the game program; and
a component configured to receive from the remote computing device markings indicating that the user would like to, after game play, purchase music associated with a content stream currently being presented and to notify an advertiser that the user would like to purchase the music.

2. The system of claim 1 further comprising allowing a user of the game program to use an interface at the remote computing device to identify select portions of content that is disseminated in a content stream to the remote computing device as preferred content.

3. The system of claim 1 further comprising allowing a user of the game program to purchase a persistently storable copy of at least a portion of content that is disseminated in a content stream to the remote computing device.

4. A method for dynamically providing content during electronic game play, the method comprising:

providing an assembly of content for presentation during game play of an electronic game program executing at a remote computing device, the electronic game program having zones representing functional areas within a game environment of the electronic game program, the content of the assembly being selected based on an identifier of a current electronic game program executing at the remote computing device, a current zone within the current electronic game program, and other information such that different content of the assembly is selected even though the identifier and the current zone are the same;

receiving a metric indicating distance of a person from content within the current electronic game program to track whether the content was presented to the person;

receiving an indication that a user is interested in making a purchase associated with content currently being presented; and notifying an advertiser of the interest of the user so that the user makes the purchase after game play wherein the assembly of content is supplemental to primary game content provided exclusively by the electronic game program, wherein the assembly of content is sent over a network in a series of multiple packets that are configured for reassembly at the remote computing device to be presented in association with the electronic game program, and wherein at least some of the multiple packets are presentable at or near arrival time at the remote computing device and before all of the multiple packets arrive at the remote computing device.

5. The method of claim 4 wherein the provided assembly of content is intended for presentation exclusively in association with the electronic game program.

6. A system for dynamically providing content during electronic game play, the system comprising:

a content providing system configured for providing, via a communication link, streamable content to one or more electronic game programs, each electronic game program executing at a remote computing device, wherein the streamable content is for presentation during game play and is supplemental to primary game content provided exclusively by the one or more electronic game programs, the content providing system including:

a content accessing component configured to access content for use as streamable content;

a content selection component configured to select content accessible by the content accessing component for use in one or more content streams;

a content assembly component configured to assemble selected content into one or more content streams;

a content dissemination component configured to disseminate one or more content streams to the remote computing device on which the one or more electronic game programs are executing for playing one or more content streams during game play of an electronic game program; and a component configured to receive from the remote computing device audibility metrics indicating audibility of content streams to the user and to track whether content streams were heard by the user, the audibility metrics indicating audible distance of a listener from a source of the audio within an electronic game program.

7. The system of claim 6 wherein the streamable content includes musical content.

8. The system of claim 6 wherein the streamable content includes video content.

9. The system of claim 6 wherein the streamable dynamic content includes non-musical audio content.

10. The system of claim 6 wherein the primary content of the one or more electronic game programs allows the one or more electronic game programs to be played without the streamable content.

11. The system of claim 6 wherein the content providing system is in communication with at least one data store storing game player information including demographic information about a game player associated with the game program, and wherein the content selection component is configured to make content selection determinations based, at least in part, on the game player information.

12. The system of claim 6 wherein the content providing system is in communication with at least one data store storing information about the one or more game programs including aspects of the primary game content provided by the one or more game programs, and wherein the content selection component is configured to make content selection determinations, based, at least in part, on the information about the one or more game programs.

13. The system of claim 6 wherein the one or more game programs are configured so that the one or more content streams disseminated by the content dissemination component are presented in the one or more game programs upon or substantially near a time of receipt at the remote computing device.

14. The system of claim 6 wherein the one or more game programs are configured so that the one or more content streams disseminated by the content dissemination component are persistently stored at the remote computing device.

15. The system of claim 6 wherein the content selection component has access to inventory element information relating to one or more inventory elements associated with the one or more electronic game programs, wherein the one or more inventory elements facilitate presentation of streamable content selected by the content selection module, and wherein the content selection component is configured to perform at least some content selection activities based on the inventory element information.

16. The system of claim 6 wherein the communication link is associated with a wireless communication network.

17. The system of claim 6 wherein the remote computing device is a mobile phone.

18. The system of claim 6 wherein the content accessing component is configured to access content from at least one external system or web site.

19. The system of claim 6 wherein the content accessing component is configured to access content from at least one internal database.

20. The system of claim 6 wherein the streamable content includes a news cast or educational content.

* * * * *